(12) United States Patent
Morano et al.

(10) Patent No.: US 10,510,114 B2
(45) Date of Patent: Dec. 17, 2019

(54) DISTRIBUTED TRADING BUS ARCHITECTURE

(75) Inventors: Matt Morano, Tenafly, NJ (US); Ian Wall, Astoria, NY (US); Samuel Gaer, New York, NY (US); Kai Neumann, Paris (FR)

(73) Assignee: New York Mercantile Exchange, Inc., New York, NY (US)

( * ) Notice: Subject to any disclaimer, the term of this patent is extended or adjusted under 35 U.S.C. 154(b) by 574 days.

(21) Appl. No.: 12/967,931

(22) Filed: Dec. 14, 2010

(65) Prior Publication Data
US 2011/0087584 A1  Apr. 14, 2011

Related U.S. Application Data

(63) Continuation of application No. 10/700,406, filed on Nov. 4, 2003, now Pat. No. 7,890,412.

(51) Int. Cl.
*G06Q 40/04* (2012.01)
*G06Q 40/06* (2012.01)

(52) U.S. Cl.
CPC .................... *G06Q 40/04* (2013.01)

(58) Field of Classification Search
CPC ......... G06Q 40/04; G06Q 40/06; G06Q 40/00
(Continued)

(56) References Cited

U.S. PATENT DOCUMENTS

| | | | |
|---|---|---|---|
| 4,980,826 A | | 12/1990 | Wagner |
| 6,021,379 A | * | 2/2000 | Duren et al. ............ 702/16 |

(Continued)

OTHER PUBLICATIONS

GEM: A Global Electronic Market System. Rachlevsky-Reich, Benny et al. Information Systems vol. 24, No. 6, pp. 495-518, 1999 (Year: 1999).*

(Continued)

*Primary Examiner* — Alexander G Kalinowski
*Assistant Examiner* — John O Preston
(74) *Attorney, Agent, or Firm* — Lempia Summerfield Katz LLC

(57) ABSTRACT

A distributed trading system for handling a plurality of order requests, each order request comprising parameters under which a participant will buy and/or sell a futures contract. A validator component is coupled to a messaging bus and has a first interface for receiving order request and an interface generating a validated order message on the messaging bus related to validated orders, wherein the validator implements processes for validating the order requests. A risk allocation value (RAV) component is coupled to the messaging bus and has an interface for receiving validated order messages from the validator, wherein the RAV component implements processes for evaluating risk associated with an order should that order be completed. A match engine is coupled to the messaging bus and has an interface for receiving validated order messages from the RAV component, wherein the match engine implements processes for matching orders based on the order-specified criteria. A persist component is coupled to the messaging bus and has an interface for receiving messages related to orders and trades, wherein the persist component implements processes for persistently storing information related to orders and trades.

20 Claims, 6 Drawing Sheets

(58) Field of Classification Search
USPC .................................. 707/37; 705/35–38, 40
See application file for complete search history.

(56) References Cited

U.S. PATENT DOCUMENTS

| | | | |
|---|---|---|---|
| 6,021,397 | A | 2/2000 | Jones et al. |
| 6,317,727 | B1 | 11/2001 | May |
| 6,321,212 | B1 | 11/2001 | Lange |
| 6,347,307 | B1 | 2/2002 | Sandhu et al. |
| 6,405,180 | B2 | 6/2002 | Tifors et al. |
| 6,421,653 | B1 | 7/2002 | May |
| 6,618,707 | B1 | 9/2003 | Gary |
| 6,658,393 | B1 | 12/2003 | Basch et al. |
| 6,721,715 | B2 | 4/2004 | Nemzow |
| 6,996,540 | B1 | 2/2006 | May |
| 7,043,457 | B1 | 5/2006 | Hansen |
| 7,089,206 | B2 | 8/2006 | Martin |
| 7,130,789 | B2 | 10/2006 | Glodjo et al. |
| 7,177,833 | B1 | 2/2007 | Marynowski et al. |
| 7,194,481 | B1 | 3/2007 | Van Roon |
| 2001/0011255 | A1* | 8/2001 | Asay et al. ............... 705/76 |
| 2001/0042785 | A1* | 11/2001 | Walker et al. ............ 235/379 |
| 2001/0056398 | A1 | 12/2001 | Scheirer |
| 2002/0002530 | A1 | 1/2002 | May |
| 2002/0035531 | A1 | 3/2002 | Push |
| 2002/0070915 | A1 | 6/2002 | Mazza et al. |
| 2002/0077947 | A1 | 6/2002 | Ward et al. |
| 2002/0099651 | A1 | 7/2002 | May |
| 2002/0116314 | A1 | 8/2002 | Spencer et al. |
| 2002/0116317 | A1 | 8/2002 | May |
| 2002/0156719 | A1 | 10/2002 | Finebaum et al. |
| 2002/0169774 | A1 | 11/2002 | Greenbaum et al. |
| 2002/0178102 | A1 | 11/2002 | Scheinberg et al. |
| 2003/0009419 | A1 | 1/2003 | Chavez et al. |
| 2003/0023542 | A1 | 1/2003 | Kemp, II et al. |
| 2003/0033240 | A1 | 2/2003 | Balson et al. |
| 2003/0050879 | A1* | 3/2003 | Rosen et al. ............. 705/35 |
| 2003/0093360 | A1 | 5/2003 | May |
| 2003/0110113 | A1* | 6/2003 | Martin .................... 705/36 |
| 2003/0125982 | A1 | 7/2003 | Ginsberg et al. |
| 2003/0200167 | A1 | 10/2003 | Kemp, II et al. |
| 2003/0220868 | A1 | 11/2003 | May |
| 2003/0229571 | A1 | 12/2003 | May |
| 2003/0236737 | A1 | 12/2003 | Kemp, II et al. |
| 2003/0236738 | A1 | 12/2003 | Lange et al. |
| 2004/0015430 | A1 | 1/2004 | May |
| 2004/0015431 | A1 | 1/2004 | May |
| 2004/0039682 | A1 | 2/2004 | Sandholm et al. |
| 2004/0049738 | A1 | 3/2004 | Thompson et al. |
| 2004/0064395 | A1 | 4/2004 | Mintz et al. |
| 2004/0088242 | A1* | 5/2004 | Ascher et al. ............ 705/37 |
| 2004/0093300 | A1 | 5/2004 | Burns |
| 2004/0103054 | A1 | 5/2004 | Singer |
| 2004/0111358 | A1* | 6/2004 | Lange et al. ............. 705/37 |
| 2004/0117302 | A1* | 6/2004 | Weichert et al. ......... 705/40 |
| 2004/0148242 | A1 | 7/2004 | Liu |
| 2004/0153391 | A1 | 8/2004 | Burns et al. |
| 2004/0153392 | A1 | 8/2004 | West et al. |
| 2004/0153393 | A1 | 8/2004 | West et al. |
| 2004/0153394 | A1 | 8/2004 | West et al. |
| 2004/0172337 | A1 | 9/2004 | Spoonhower et al. |
| 2004/0186806 | A1 | 9/2004 | Sinclair et al. |
| 2004/0210514 | A1 | 10/2004 | Kemp, II et al. |
| 2004/0236662 | A1 | 11/2004 | Korhammer et al. |
| 2004/0254804 | A1 | 12/2004 | Peterffy et al. |
| 2005/0044027 | A1 | 2/2005 | Rodgers et al. |
| 2005/0076152 | A1 | 4/2005 | Sweeting |
| 2005/0080703 | A1 | 4/2005 | Chiesa et al. |
| 2005/0097026 | A1 | 5/2005 | Morano et al. |
| 2005/0097027 | A1 | 5/2005 | Kavanaugh |
| 2005/0137964 | A1 | 6/2005 | Nordlicht et al. |
| 2005/0171890 | A1 | 8/2005 | Daley et al. |
| 2005/0171894 | A1 | 8/2005 | Traynor |
| 2005/0187866 | A1 | 8/2005 | Lee |
| 2005/0246263 | A1 | 11/2005 | Ogg et al. |
| 2005/0283422 | A1 | 12/2005 | Myr |
| 2006/0059064 | A1 | 3/2006 | Glinberg et al. |
| 2006/0059065 | A1 | 3/2006 | Glinberg et al. |
| 2006/0059066 | A1 | 3/2006 | Glinberg et al. |
| 2006/0059067 | A1 | 3/2006 | Glinberg et al. |
| 2006/0059068 | A1 | 3/2006 | Glinberg et al. |
| 2006/0059069 | A1 | 3/2006 | Glinberg et al. |
| 2006/0095363 | A1 | 5/2006 | May |
| 2006/0149660 | A1 | 7/2006 | Morano et al. |
| 2006/0161498 | A1 | 7/2006 | Morano et al. |
| 2006/0173761 | A1 | 8/2006 | Costakis |
| 2006/0190371 | A1 | 8/2006 | Almgren et al. |
| 2006/0190383 | A1 | 8/2006 | May |
| 2006/0265296 | A1 | 11/2006 | Glinberg et al. |
| 2007/0011079 | A1 | 1/2007 | May |
| 2007/0100732 | A1 | 5/2007 | Ibbotson et al. |
| 2007/0112665 | A1 | 5/2007 | Mackey, Jr. et al. |
| 2007/0239591 | A1 | 10/2007 | May |
| 2007/0282733 | A1 | 12/2007 | May |
| 2008/0077320 | A1 | 3/2008 | Loftus et al. |
| 2008/0133402 | A1 | 6/2008 | Kurian et al. |
| 2008/0154764 | A1 | 6/2008 | Levine et al. |
| 2008/0183639 | A1 | 7/2008 | DiSalvo |
| 2008/0208778 | A1 | 8/2008 | Sayyar-Rodsari et al. |
| 2008/0288386 | A1 | 11/2008 | Ferris |
| 2008/0288391 | A1 | 11/2008 | Downs et al. |
| 2009/0076982 | A1 | 3/2009 | Ginsberg et al. |
| 2009/0083175 | A1 | 3/2009 | Cushing |
| 2009/0106133 | A1 | 4/2009 | Redmayne |
| 2009/0063365 | A1 | 5/2009 | Pinkas |
| 2009/0157563 | A1 | 6/2009 | Serbin et al. |

OTHER PUBLICATIONS

Measuring the cost of scalability and reliability for Internet-based, server-centered applications. P. Ezhilchelvan et al. Proceedings Sixth International Workshop on Object-Oriented Real-Time Dependable Systems. Jan. 2001 (Year: 2001).*

A Dependable Distributed Auction System: Architecture and an Implementation Framework. Paul Ezhilchelvan and Graham Morgan. Proceedings Fifth International Symposium on Autonomous Decentralized Systems. Mar. 2001 (Year: 2001).*

Augmenting agent negotiation protocols with a dynamic argumentation mechanism, by Ulrich, Thomas W., D.CS., Colorado Technical University, 2003, 253 pages; AAT 3109037.

PCT/US06/44932 International Search Report, dated Aug. 19, 2008.
PCT/US06/43282 International Search Report, dated May 30, 2008.
PCT/US06/44702 International Search Report, dated Aug. 17, 2007.
PCT/US06/44917 International Search Report, dated Aug. 28, 2007.
PCT/US06/28001 International Search Report, dated May 7, 2007.
PCT/US06/27762 International Search Report, dated Mar. 9, 2007.

CME® "Clearing Services CME and LCH," Advisory Notice, http://www/web.archive.org/web/20050306002321/http://www.cme.com/clearing/rmspan/cm/lch . . . , last accessed Feb. 22, 2007, 1 page.

CME® "Clearing Services Layout for Results," Advisory Notice, http://www/web.archive.org/web/20050308181020/http://www.cme.com/clearing/rmspan/cm/rec . . . , last accessed Feb. 22, 2007, 2 pages.

CME® "Foreign Exchange Products; Trading CME FX Futures: Maximizing the Opportunity for the Individual Investor," 2005, 6 pages.

CME® "Glossary for Retail FX," http://www.cme.com/files/FXWebglossary.pdf, 16 pages.

Position Limit, http://www.investopedia.com/terms/p/positionliit/asp, 1 page.

U.S. Commodity Futures Trading Commission, "Security Futures Products Speculative Position Limits," http://www.cftc.gov/industryoversight/contractsandproducts/sfpspeculativelimits.html, Jul. 26, 2007, 1 page.

U.S. Commodity Futures Trading Commission, "What's New at the CFTC," http://www.cftc.gov/index.htm, Mar. 19, 2009, 2 pages.

U.S. Commodity Futures Trading Commission, "Trading Organizations," http://www.cftc.gov/industryoversight/tradingorganizations.index.htm, Mar. 19, 2009, 1 page.

(56) References Cited

OTHER PUBLICATIONS

U.S. Commodity Futures Trading Commission, "Clearing Organizations," http://www.cftc.gov/industryoversight/clearingorganizations/index.htm, Mar. 19, 2009, 2 pages.

Hall, "Getting Started in Stocks," Third Edition, Google Book Search, http://books.google.com/books?id=mA-sSK mB2sC&dg=margin+account+maintenance . . . , Sep. 26, 2008, pp. 105-114, Coughlan Publishing, 1997.

PCT/US2010/046591 International Search Report dated Oct. 13, 2010.

PCT/US2010/047075 International Search Report dated Oct. 14, 2010.

PCT/US2010/047489 International Search Report dated Oct. 25, 2010.

PCT/US2010/047086 International Search Report dated Oct. 13, 2010.

\* cited by examiner

DISTRIBUTED TRADING BUS ARCHITECTURE

CROSS-REFERENCE TO RELATED APPLICATIONS

This application is a continuation of U.S. patent application Ser. No. 10/700,406 filed Nov. 4, 2003, the contents of which is expressly incorporated herein by reference in its entirety.

BACKGROUND OF THE INVENTION

1. Field of the Invention

The present invention relates, in general, to financial transaction software, and, more particularly, to software, systems and methods for processing transactions in a regulated exchange in a distributed fashion.

2. Relevant Background

The present invention relates to systems, methods and a computer software architecture for trading in a futures trading marketplace. Futures and options trading are important techniques for coping with the price uncertainty of a free market. Price uncertainty creates risks and opportunities. Futures and options markets provide a forum for commercial interests in a commodity to hedge against price risk by transferring that risk to those more willing and able to bear it, or to those commercial interests with inverse risk profiles. An active futures market provides a readily available, widely accepted reference price for the underlying commodity, thereby improving the efficiency of the overall market. Futures can also be used for investment purposes to mitigate pure financial risks and/or pursue purely financial goals.

A futures contract is a contract between a buyer and seller, whereby the buyer is obligated to take future delivery and the seller is obligated to provide future delivery of a fixed amount of a commodity at a predetermined price at a specified location. The contracts are standardized so that the price of the contract has strong relationship to the value, and the expected fluctuations in value, of the underlying commodity. Futures contracts are traded until a set point in time before the contract-specified delivery date and in many, if not most, cases the positions are closed before physical delivery takes place. Futures contracts are traded exclusively on regulated exchanges. These auction markets include, in many cases, "open outcry" markets as well as electronic trading. A futures market or exchange provides a mechanism where the futures contracts themselves can be bought and sold, much like a stock exchange provides a mechanism in which ownership in business entities can be bought and sold.

These exchanges implement systems that create and manage accounts for buyers and sellers, enable market participants to communicate transaction information, and execute transactions in a reliable fashion. It is desirable to provide these systems in a manner that minimizes transaction overhead. Like any market, a regulated exchange strives to bring many buyers and sellers together. Generally speaking, active markets are considered more efficient. In other words, the larger the number of participants and the larger the transaction volumes, the more likelihood exists that the market will result in fair prices for the products being exchanged. In turn, confidence that prices are fair leads to greater participation. Hence, an exchange's systems and software must support large transaction volumes and scale over time to handle variable transaction volume and numbers of participants.

Another attribute of a strong exchange is the ability to provide buyers and sellers with sufficient information about completed transactions so that they can better value their own transactions. Capturing, processing, and delivering transaction information in real time increases confidence of buyers and sellers. Accordingly, the exchanges strive to provide systems and methods that reliably capture and record transactions, and execute those transactions efficiently and precisely.

An exchange also attempts to control transaction risks. While market participants accept risks associated with the underlying products they are purchasing (e.g., commodities futures and options), they desire to lessen risks associated with the marketplace itself. For example, in any transaction a potential exists that a buyer will not have sufficient funds to complete a purchase. To protect against this "counterparty credit risk", exchanges require that market participants maintain a certain level of liquid assets on deposit called margin. As soon as anyone buys or sells a futures contract, they must deposit with their clearing member an amount of money that the exchange determines is sufficient to cover any one-day price move. As long as that person or firm holds on to the contract, the exchange must maintain minimum margin funds on deposit for that position, with the contract holder depositing additional funds whenever the market moves against him.

Contract values change continuously, however, and so exchanges implement processes to periodically assess the current value of customers' holdings and adjust margin requirements accordingly. "Clearing" refers to the processes of registration and settlement of a trade that includes provisions for margin requirement and performance guarantee. The "settlement price" is the price established by the exchange settlement committee at the close of each trading session and is the official price to be used by the clearinghouse in determining net gains or losses as well as margin requirements. In an active exchange the process of daily clearing involves millions of computations and account postings that must be performed in a very few minutes. Accordingly, the software and systems required to support this exchange activity are very complex.

Open outcry trading takes place on a physical trading floor where brokers exchange bids and offers for futures contracts. Executed trades are then recorded by hand or entered into an electronic recording system. The completed trades are later sent to an external or internal clearinghouse to process the trades and issue appropriate reports to the futures exchange and its members. Futures markets are also maintained on electronic trading systems. These electronic trading systems allow entry of a bid or offer for a particular futures contract. One can also enter orders for combinations of futures orders, e.g., spread or strip orders. A spread order buys one or more futures contracts and sells one or more futures contracts simultaneously at a single "differential" price. A strip order buys (or sells) two or more futures contracts simultaneously at a stated differential price from the previous settlement prices for each contract in the strip or at an average, i.e., "flat," price. The orders are time stamped by the trading system as they are entered. The system then matches a bid with an appropriate offer. Bids and offers are matched in the sequence in which they are received, hence, a buyer does not select a particular seller. The trading system then generates appropriate information for the clearinghouse.

Automated trading systems are complex software systems that assist exchanges in their efforts to implement the various process required by the exchange. These systems implement a variety of functions such as order entry, order validation, buy-sell order matching and publishing information in a form that is useful to transaction clearing entities. All of these functions are performed in a reliable, auditable fashion so that customers of the exchange can be assured of consistency. Automated futures trading systems were initially developed to support conventional trading by capturing data from trades executed by floor brokers. Such systems include processes for recording executed trades, rejecting unacceptable trades, and clearing acceptable trades. However, these systems are working with executed trades and so did not include processes for automating many of the tasks that were handled by the floor brokers.

Electronic trading systems that receive orders over a network, on the other hand, desirably include processes for executing trades. Early systems included processes for receiving orders over a network, but then handled those orders through a floor broker in a traditional manner. Another requirement for electronic trading systems is that they interface with the existing trading systems that support floor-brokered trades. Because of this need some systems have simply tacked on an electronic transaction interface to an existing centralized trading application. However, such approaches impose the deficiencies and limitations of the centralized trading application onto the electronic trading application.

Transactions must either be completed in a manner that satisfies both the buyer and seller, or must be discarded. A partially completed transaction is not allowed. A partially completed transaction is one that satisfies the buyer, but not the seller, or a transaction that satisfies both the buyer and seller partially, but not fully (e.g., when only a portion of both of these orders is filled). This factor, in combination with the highly specialized nature of trading systems, has led to centralized software implementation. These prior systems comprise complex, tightly coupled components that would execute on one or more mainframe computers.

However, complex, centralized software systems tend to be expensive to obtain, inflexible, and difficult to maintain. The tight coupling and interdependence between functional components leads to unexpected results when components are upgraded or added. When the systems are based on mainframe computer environments, the hardware acquisition and maintenance is also expensive. As a result, these systems are slow to adapt to newer technologies and to support new business initiatives.

Often times centralized trading systems do not scale well. In the field of trading system software, it is not acceptable to have a system that fails when faced with large transaction volume. Accordingly, centralized systems are built from the beginning to support the largest expected transaction volume, even though this level of activity may be rarely if ever used. When the trading activity approaches the designed limit, the system must be replaced or extensively reworked in order to support the larger transaction volumes. It would be desirable to implement trading system software and systems that scale gracefully to avoid the expense and disruption associated with system replacement.

Centralized trading systems, also called trading platforms, tend to offer limited and proprietary interfaces to external systems. Because a centralized system implements all or nearly all of the trading functions internally, there is little need for communication with external systems. Operators can be specially trained to handle various activities such as order entry and report generation, and so the systems tend to have limited, difficult to use interfaces to both humans and other machines. However, there is an increasing desire to allow trading firms to use front-end applications that best fit their trading requirements. It is therefore desirable to be able to implement trading systems with improved ability to communicate with a wide variety of software and third party systems.

In many fields of software development, complex software is now being implemented in the form of distributed systems. These systems include functional components with a high degree of logical separation so that each component is largely insulated from the actions of other components. Distributed systems leverage the improved abilities to communicate between system components so that complex functions can be implemented as many small components. These smaller components are easier to design and maintain, and provide much greater flexibility in adapting to a variety of computer hardware/operating system environments. Until now, however, distributed system architectures have not been applied to trading system software.

SUMMARY OF THE INVENTION

Briefly stated, the present invention involves a distributed trading system architecture for handling a plurality of order requests, each order request comprising parameters under which a participant will buy and/or sell a futures contract. A validator component is coupled to a messaging bus and has a first interface for receiving order request and an interface generating a validated order message on the messaging bus related to validated orders, wherein the validator implements processes for validating the order requests. A risk allocation value (RAV) component is coupled to the messaging bus and has an interface for receiving validated order messages from the validator, wherein the RAV component implements processes for evaluating risk associated with an order should that order be completed. A match engine is coupled to the messaging bus and has an interface for receiving validated order messages from the RAV component, wherein the match engine implements processes for matching orders based on the order-specified criteria. A persist component is coupled to the messaging bus and has an interface for receiving messages related to orders and trades, wherein the persist component implements processes for persistently storing information related to orders and trades.

DETAILED DESCRIPTION OF THE PREFERRED EMBODIMENTS

The present invention is illustrated and described in terms of a distributed computing system. The particular examples identify a specific set of components useful in a futures and options exchange, however, many of the components and inventive features are readily adapted to other electronic trading environments. The specific examples described herein may teach specific protocols and/or interfaces, although it should be understood that the invention is readily extended to other protocols and interfaces in a predictable fashion.

Figure 1:
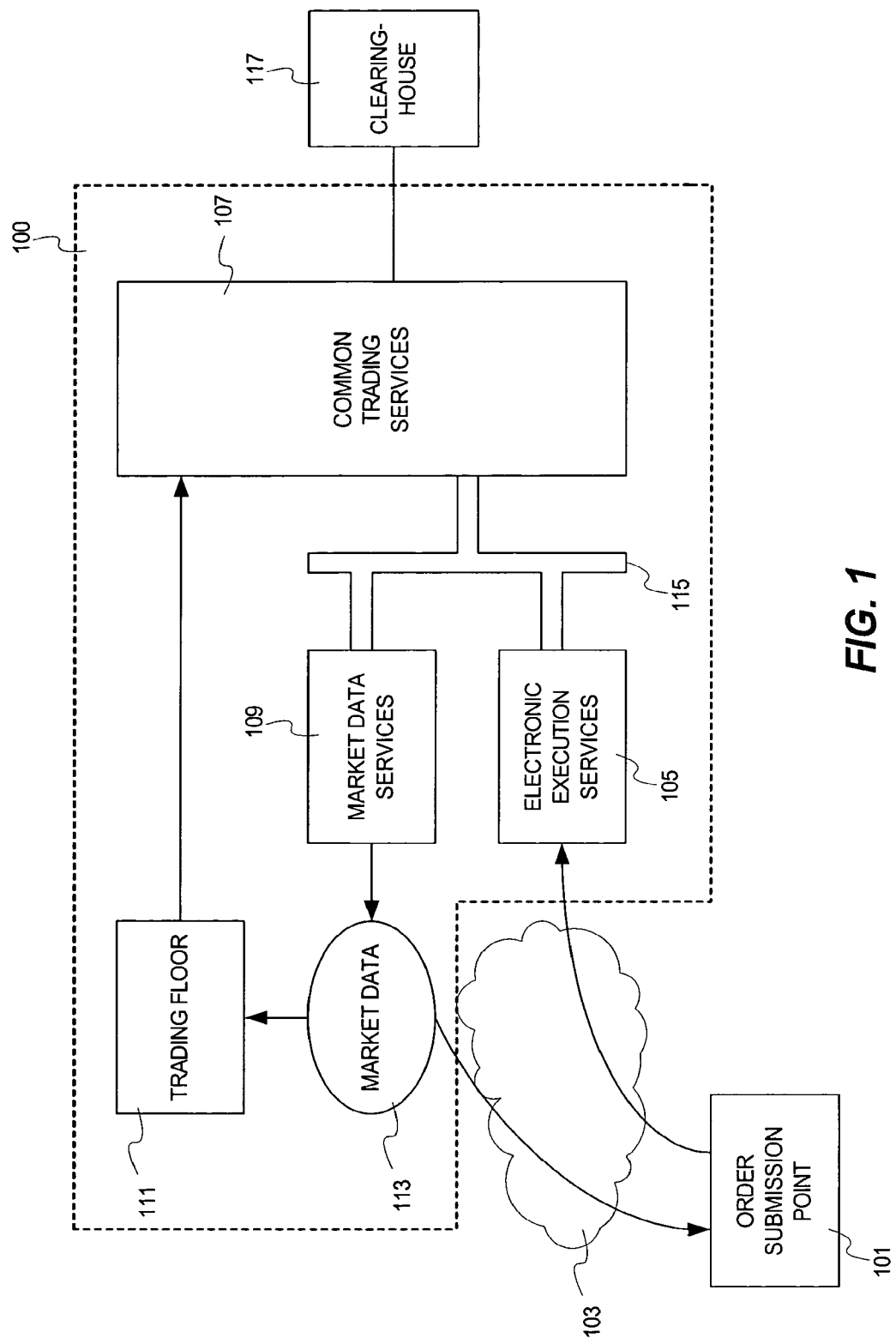
FIG. 1 shows a distributed trading architecture in which the present invention is implemented.

Regulated exchanges such as the New York Mercantile Exchange (NYMEX), assignee of the present invention, Chicago Board of Trade (CBOT), MidAmerica Exchange (MIDAM), Chicago Mercantile Exchange (CME), Kansas City Board of Trade (KCBT), and others implement a trading platform such as system 100 in FIG. 1 to conduct futures contract exchanges in an orderly manner. Trading platform 100 accepts orders, matches and records orders; collects and maintains margins; allocates margins according to the positions of the clearing members; matches open short with open long positions for delivery; allocates delivery notices; and generates trading and delivery statistics. A clearinghouse 117 acts as a fiscal transfer agent, transferring money from the margin funds of traders who have incurred a loss in the futures market on any given day to the margin funds of traders who have generated a gain. The exchange's clearing members accept responsibility for all trades cleared through them, and share secondary responsibility for the liquidity of the Exchange's clearing operation.

Trading platform 100 includes components that implement the various exchange functions necessary to support both electronic futures trading and trades executed on the trading floor 111. Conventional trading floor trades are managed and cleared by various processes within the common trading services 107. Electronic orders are conducted from an order submission point 101. In the particular example, order submission point 101 exists outside of the exchange and trading platform 101, however, there is no reason why an order submission point could not also supplement or replace trading floor activities.

Electronic orders are conducted by way of a communication network 103, such as the Internet. It is contemplated that order submission points may take on a wide variety of application-specific designs to suit the needs of particular brokerages, investors, investment plans and the like. Order submission point(s) 101 communicate with electronic execution services 105. Electronic execution services 105 implement, among other services, order validation logic to ensure that orders comply with certain standards imposed by the exchange. For this reason it is important that all communications from order submission point 101 enters platform 100 through a suitable order validation service.

Another important function of the trading platform 100 is to gather and provide market data to both market participants and external third parties. Market data services 109 gather market data 113 as transactions are executed. The market data 113 includes raw data, formatted data, as well as derivative (i.e., analyzed) data. Market data 113 may be provided by any available protocol and may be provided immediately and/or after a delay.

An important feature of the present invention is the use of enterprise messaging architecture (EMA) bus 115 to exchange messages between components of platform 100. In a specific example, EMA bus 115 is based on a TIBCO® SmartSocket® messaging bus, although equivalent alternatives include middleware such as Java Messaging Services, Arujuna Message Service, MQSeries messaging products available from IBM, and SonicMQ provided by Sonic Software as well as other messaging products. Messages are sent and received via a publish/subscribe method. Publish and subscribe enables components 105, 107 and 109 share up-to-date information reliably. Unlike a request/reply-messaging scheme, the publish/subscribe method does not require a direct request for a message to be made before the message is published to EMA bus 115.

Using EMA bus 115, the present invention defines a set of messages between the various components. For each message, one component is a publisher and one or more other components are subscribers. A configuration table associated with each component identifies the messages to which that component subscribes. When a message is published, all subscribing components receive the message and can act on it concurrently and independently. To change the subscriber-publisher relationships so that more or fewer components respond to particular message types, all that is required is to update the configuration tables of the affected components.

In this manner, EMA 115 implements a user defined and dynamically definable messaging protocol between the various components, and enables the components to operate in an independent, distributed fashion. In an exemplary embodiment, messages on EMA bus 115 comprise self-describing messages such as extensible markup language (XML) documents. An XML schema is defined for each message type, for example, so that every component can validate messages as complying with the XML schema. Moreover, the variety and information content of each message can be readily updated using an XML schema.

Figure 2:
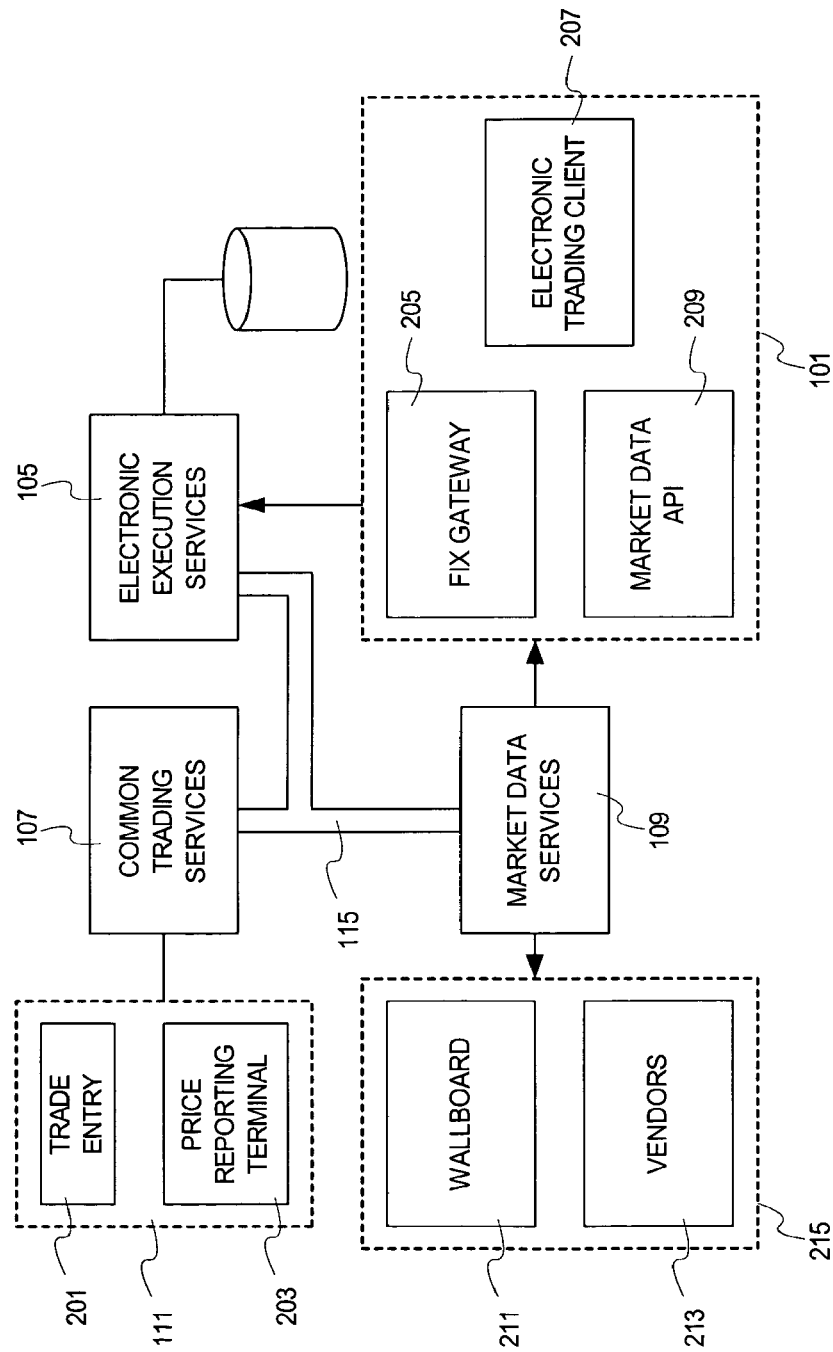
FIG. 2 shows a distributed trading system environment of FIG. 1 in greater detail.

FIG. 2 shows a distributed trading system environment of FIG. 1 in greater detail, particularly with respect to the system components that are not connected to the EMA bus 115. The consumers and producers of information such as orders and market data are organized into clusters in particular embodiments. These components are essentially the user interface components.

Trading floor component 111 comprises, among other functions, trade entry mechanisms 201 and price reporting mechanisms 203. Although trades executed on a trading floor are executed using traditional processes, they must be entered into the trading platform 100 to be handled by common trading services 107. The data entry will indicate, for example, price, customer ID, information about the floor broker, time, commodity, delivery date and place of delivery, or other information required/desired by the exchange. Common trading services 107 may include processes for verifying that the trade meets certain exchange criteria and complies with exchange rules such as margin requirements, trading procedures, position sizes, and other criteria. Trading floor 111 may also include price reporting terminals 203 which may be implemented as network connected terminals coupled to trading services component 107 or as wireless devices such as personal digital assistants (PDAs). Price reporting terminals 203 can be used to enter price information related to executed trades and to view market data information on the trading floor 111.

FIG. 2 illustrates a variety of devices that can be used to implement order submission points 101. A FIX gateway 205 is an example of a third party standard system to which the present invention may readily be adapted to support. The Financial Information eXchange (FIX) protocol is a messaging standard developed specifically for the real-time electronic exchange of securities transactions. FIX is a public-domain specification owned and maintained by FIX Protocol, Ltd. FIX is a relatively easy-to-implement, open standard for communicating financial information in a secure but nonproprietary way between two parties. Increasingly, implementations are available from vendors in the form of toolkits or FIX-enabled software packages. FIX gateway 205 can be written specifically for an application or purchased in the form of a toolset from a number of vendors.

Electronic trading client 207 represents an application using either open standards or proprietary design that implements an order entry interface using client software such as a web browser. In a particular example, electronic trading client 207 is implemented with NYMEX ClearPort™ trading software that runs on a web browser such as Microsoft Internet Explorer. ClearPort is a trademark or registered trademark of the New York Mercantile Exchange, Inc. in the United States and other Countries. An electronic trading client 207 can be readily adapted to provide a customized, easy to maintain order entry interface that provides an application-specific set of functionality, in addition to supporting communication with electronic execution services 105. The NYMEX ClearPort technology network is an extremely flexible system offering market participants wide latitude in meeting specific needs. NYMEX ClearPort is an open system, which allows trading firms to customize front-end applications to best fit their trading requirements.

Order submission point 101 also includes a market data application programming interface (API) 209 which functions to receive market data from market services component 109. This market data may include user-specific and/or application specific information on the status of trades, failure notifications, execution notifications and the like. The market data may also include general market information, news, analysis and the like that can be used in planning future trades. In a particular example, market data is provided to market data API 209 using open standards protocols and formats such as Java™ and/or XML.

Cluster 215 represents devices for using market data from market data services component 109. For example, wallboard systems are frequently used to convey information on trading floor 111. Electronic wallboards on each trading floor display virtually all needed price information on each of the most actively traded commodities, including the opening range, the previous day's closing price, the day's price limits, the high and low trade prices of the day, the three most recent trade prices and/or best bid or offer, and the net change from the settlement price. In addition, the high, low, last, and net change in prices on other exchanges are displayed.

Providing market data to vendors 213 is a significant activity for an exchange. Market data from a futures exchange is frequently used as a basis for many transactions involving similar commodities outside of the exchange. Vendors 213 purchase the market data and provide it in either raw or analyzed form to subscribers. The value of this market data to vendors 213 is largely dependent on its timeliness. Accordingly, the close integration of market data services 109 to the real time market data available in trading platform 100 allows data to be provided to vendors 213 in an exceptionally timely and reliable fashion.

In a specific embodiment, the market data is provided to cluster 215 from market data services 109 using an ITC 2.1 protocol. ITC 2.1 is a standard message format that was developed by the Inter-Exchange Technical Committee. It is used by the major U.S. futures exchanges. The present invention supports the use of ITC 2.1 messages format for distributing market data from the market data server to devices that require that format, such as wallboards, data vendors, personal digital assistants (PDAs), and a variety of other data users. One feature of the present invention is an ability to collect, process, and display wallboard information in a timely fashion by placing market data services 109 on EMA 115.

Figure 3:
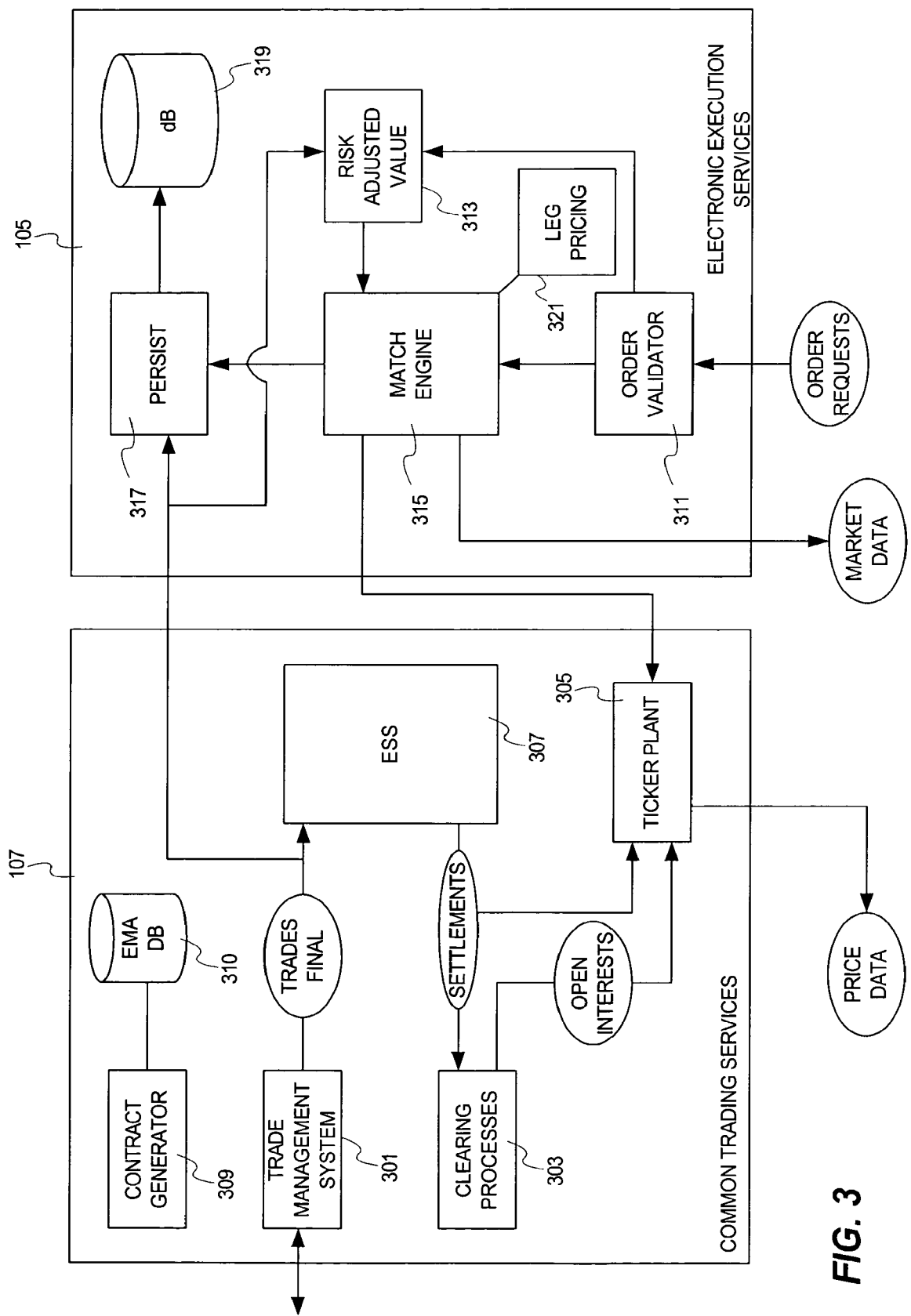
FIG. 3 shows an alternative view of the distributed trading system of FIG. 1 in greater detail.

FIG. 3 illustrates the embodiment of FIG. 1 with detailed emphasis on the components 105 and 107 that are coupled to EMA bus 115. Common trading services component 107 includes trade management system 301 that receives trade information from trading floor 111 and verifies that the trade information satisfies business rules of the exchange. Verified trades are made final and passed to an electronic settlement system (ESS) component 307. ESS component 307 comprises a system that takes trade survey data from outside cooperative traders and brokers and calculates a proposed settlement price. These proposed settlement prices are typically subjected to an approval process such as review by a research department, expert review, or other processes for scrutiny and approval that are implemented by a particular exchange. Proposed settlement prices are published to EMA bus 115 for dissemination to various systems including the price vendor community.

In the specific implementation of FIG. 3, ESS 307 receives data about completed trades from trade management system 301 and calculates a settlement price automatically as an automated substitute for the conventional role played by settlement price committee. Current practice relies upon the decisions of settlement price committee member(s), whom are also trading members of the exchange, to determine what the settlement prices should be. In other words, traders themselves decide the settlement prices, which creates a conflict of interest situation. In contrast, the present invention contemplates that ESS 307 can suggest a settlement price and an exchange employee (e.g., an expert or research personnel) will adjust and/or approve the suggested settlement prices and publish this information. When ESS 307 is used in this latter capacity, it may continue to receive survey data from cooperative traders (e.g., data related to OTC-traded commodities) and calculate suggested settlement prices for research's consideration and approval. The particular algorithms used to compute settlement prices, the choice of what data is considered in the settlement price computation, and the form in which the settlement price information is presented are matters that can be selected to meet the needs of a particular application.

The settlement price is the final price established by the exchange settlement committee at the close of each trading session as the official price to be used by the clearinghouse in determining net gains or losses, margin requirements, and the next day's price limits. Final trades are also communicated to persist object 317 so that executed trades are safely stored in persistent storage of database 319.

Data related to settlement prices and trades are output to clearing processes 303. Clearing processes 303 are designed for high-volume, high-capacity clearing and settlement of exchange-based transactions. The system processes reported trades and tracks positions continuously in real time or near real time, providing users with instantaneous information on trades, positions and risk exposure. The open or outstanding contracts are communicated to ticker plant 305. Open interests are contracts for which an individual or entity is obligated to the exchange because that individual or entity has not yet made an offsetting sale or purchase, an actual contract delivery, or, in the case of options, exercised the option. Ticker plant 305 comprises a collection software processes that consolidate the raw market data and distribute that data with low latency as well as high integrity and reliability. Ticker plant 305 distributes the market data that it collects and conveys that data to, for example, to market data services 109 and/or price reporting terminals 203.

Most of the component processes in common trading services 107 correspond directly to processes that have been used conventionally to handle trades from trading floor 111. However, by coupling common trading services 107 to the EMA bus 115, these otherwise conventional processes are now able to use new processes such as the persist component 317 and risk allocation value component 313. In this manner, common trading services can be augmented by distributed services implemented by objects that are reachable through the EMA bus 115, greatly improving the expandability of common trading services 107.

Contract generator 309 comprises processes that enable spread and strip markets. A "strip" involves simultaneous purchase (or sale) of an equal number of futures positions in consecutive months. A twelve-month strip, also known as a calendar strip, consists of an equal number of futures contracts for each of twelve consecutive contract months. A "spread" refers to a variety of transactions that involve simultaneous purchase and sale of futures contracts for different months, different commodities, different grades of the same commodity, or other combination in which the two sides of the spread offset each other in some way. Hence, a contract order in the case of strips and spreads involves multiple buy/sell transactions, all of which must be completed for the contract order to be satisfied. Contract generator 309 receives data related to outright futures and options (i.e., contracts that do not involve spreads and strips) from the clearing processes 303 via EMA bus 115.

Contract generator 309 groups the outright futures contracts into "tradeable" spreads and strips and populates the contract tables in EMA database 310 with the strip and spread contracts. EMA database 310 contains firm, user, product, contract, orders, and trades data. This data is populated by direct user interfaces (firms, users, products), automated processes (contract populator and contract generator 309) as well as by trades and orders being written to the database due to trades and orders occurring in the system. The trading system loads the outright future, strip and spread contracts for trading.

The electronic execution services 105 shown on the right hand side of FIG. 3 include a number of functional components that illustrate the power of the distributed program architecture in accordance with the present invention. Each of the components within electronic execution services 105 can be implemented by, for example, a program object such as a Java™ object. Java is a trademark or registered trademark of Sun Microsystems Inc. in the United States and other countries. Many instances of the various objects can exist at any given point in time thereby enabling a high level of concurrency in program execution. Each instance of a component is associated with a particular contract or cluster of contracts. In general, failure of one object will not impact other objects, although care is taken to ensure that all objects have a synchronized view of the state of each transaction that is being handled by the system.

The present invention may be implemented in a manner that supports multiple "contract clusters" or in a manner in which contract clustering is not involved. A contract cluster is essentially a group of contracts that are sufficiently related that offers to sell and bids to buy the contracts within a contract cluster can be matched against each other. For example, a "contract cluster" may comprise two contracts sharing a spread or strip relationship that requires that implied markets be generated between the two markets. In some implementations it may improve performance and efficiency to create and maintain components such as match engine 315 and persist component 317 on a contract cluster basis rather than a single instance for all contracts. When contract clustering is used, a unique identification called the cluster ID is associated with each cluster. In the particular example, each message placed in the EMA bus is tagged with the cluster ID. Each component is configured to recognize a particular cluster ID and ignore messages associated with other cluster IDs. Accordingly, when a new cluster is added or removed, the component configuration files are updated accordingly.

Validator 311 is the entry point for orders into the system, either from client 207, FIX interface 205, or an equivalent order entry front-end. Validator 311 performs various validations (exchange active, contract active, markets open, user assigned to account, high/low limits etc.) and either passes on successful orders to risk allocation value (RAV) component 313 or 315. Errors are reported back to the client. Any number of validators 311 may be instantiated at any given time. In a typical embodiment, each client connection initiates the creation of a validator 311.

Validator 311 is a publisher for an "AddOrder" message that is subscribed to by risk allocation value component 313. An AddOrder message is placed on EMA bus 115 when an order request has been validated. An AddOrder message comprises an XML document that is validated against an AddOrder XML schema. The validator 311 subscribes to market state messages enabling the use of market state information when validating orders. Validator 311 also subscribes to RejectOrder messages from RAV component 313 and/or match engine 315. Validator 311 includes processes for notifying the customer that submitted a rejected order of the rejection and optionally other data that describes reasons for the rejection.

Because the messages on EMA bus 115 are self-describing, it is not necessary for validator 311 to maintain state information for each transaction that passes through it. If an order is rejected, the associated RejectOrder message on the EMA bus 115 will include sufficient information to enable validator 311 to fulfill its function of generating appropriate notifications.

Risk allocation value component (RAV) component 313 includes processes that evaluate the affect of proposed transaction against clearing member rules such as margin requirements, position size, and the like. For example, a clearing member may establish an account and set an overall "RAV limit" in dollars terms, e.g., $100,000, to control the total size of positions that the account may establish across all commodity contracts that the clearing member has permissioned the account to trade. The RAV limit works in a similar fashion as does "original margin." In a specific implementation, upon entry of a new order, RAV component 313 accepts or rejects the order by considering the existing positions for the account identified on the order and any matchable order for that account. After determining a "worst case" trading scenario (i.e., a scenario that leads to the greatest RAV requirement), RAV component 313 calculates the RAV value necessary to support the worst case position generated by the order request and, based on the account's preset RAV limit of $100,000, either accepts or rejects the order. In addition to the clearing member setting an overall RAV limit value and permissioning the account to trade in particular commodity contracts, a clearing member may set net long and/or net short position limits per commodity for the account. When either the RAV limit or the position limit values would be exceeded due to the entry of a new order, then the order will be rejected and it will not be matchable in the system. RAV component 313 is a subscriber to AddOrder messages from validator 311 as well as RejectOrder messages from the match engine 315. Upon receiving a RejectOrder message, RAV component 313 may take remedial action to note failure of the order. Such action may include allowing another order to pass to its match engine 315 as the risk allocation value computations can now ignore the failed order request.

Match engine 315 will reject orders for a variety of reasons such as duplicate order identifications, format problems, and the like. Assuming the nominal case of a well-formed order, match engine 315 passes all new orders, regardless of whether they are matched or not, to the persist component 317. This is performed using a PERSIST message on the EMA bus 115 for which match engine 315 is a publisher and persist component 317 is a subscriber. The Persist message includes information indicating whether the order was matched to another complementary order, so that the persist component 317 can be synchronized with the trade information, if necessary.

Match engine 315 should subscribe to EMA bus messages pertaining to high/low limits. Match engine 315 will need to round prices for implied transaction to high/low limits. When the limits change, match engine 315 recalculates the markets. When an implied bid is generated above the high limit, then match engine 315 rounds the resultant high limit bid price to the limit price for display purposes on trading screens and in market data. When the high limit price was increased via a price limit adjustment, then the match engine recalculates the high bid price that should be displayed to the marketplace. If the new high limit price is still less that the system-generated implied bid price, then the new high bid price would be the new limit price. If the implied bid price were less than the new high limit price, then the new high bid price is the system-generated implied bid price. Match engine 315 also publishes EMA bus messages that convey market data such as best bid and best asked for the contract cluster. These market data messages are subscribed to by the ticker plant 305 and market data services component 109, for example.

In a particular embodiment, match engine 315 and persist component 317 are scaled at a contract cluster level of granularity. That is to say, an instance of match engine 315 and an instance of a persist component 317 are created for every contract cluster rather than for every contract. As noted hereinbefore, a "contract cluster" may comprise two contracts sharing a spread or strip relationship that requires that implied markets be generated between the two markets. When this happens, matching engine 315 must consider an order entered into one contract as potentially causing a match in the second contract, thereby requiring that the matching engine 315 consider the two contracts simultaneously when determining matches. When contract clustering is used, a contract can only belong in one cluster and many contracts can be in the same cluster.

For example, a single contract cluster might exist for contracts such as light sweet crude oil (CL), heating oil (HO), unleaded gas (HU), Brent Crude Oil (SC), Light Louisiana Sweet Crude Oil (LS), Mars blend crude oil (MB), West Texas Sour Crude Oil (TS), because there are CLHO, CLHU, HOHU, SCCL, TSCL, MBCL, LSCL spread markets that require implied markets to be generated. The four-letter market identifiers indicate a spread contract comprising two markets, each identified by a two-letter identifier. Hence, the contract cluster includes all of the constituent outright futures contracts that are necessary to make up a spread transaction.

In a futures contract exchange all contracts for delivery of a specific product at a specific delivery point and delivery date will be together in a contract cluster. Tens, hundreds or thousands of contract clusters will exist at any given time. Contract clusters are associated with a unique identification, and messages on the EMA bus 115 include the relevant contract cluster ID. In this manner an order is readily directed to the match engine that is relevant to that order. A match engine instance will remain alive in the system for as long as the contract cluster exists. As each new contact cluster is added, a corresponding new match engine 315 is created. As a contract cluster rolls off (e.g., when the underlying futures contract delivery date passes) the corresponding match engine 315 is destroyed. When a contract cluster is added or rolled off, the configuration files for each of the system components are updated to reflect a current list of active contract clusters.

Although contract cluster can be made larger, searching for matches becomes incrementally more complex and time-consuming as match engine 315 must attempt to match more parameters. In the implementation described above, matching is a much simpler algorithmic process. Matching is performed on a first in first-match basis. Accordingly, given two bids at the same price and only one offer, the bid that was first in time to reach match engine 315 will be matched. The competing bid will go unmatched until a subsequent satisfactory offer arrives at match engine 315.

Each order is preferably associated with a time in force value indicating whether the order is a day order, good until cancelled (GTC), or good until the end of a specific date (GTD). The match engine 315 may identify a matching order at any time during its existence for orders that remain active. When a match is found the match engine publishes a TRADES EMA bus message to the persist component 317. Match engine 315 generates the trade sequence IDs and trade timestamp. In practice, a match may require two messages to persist component 317, one for the new order that caused the trade and one for the TRADES message. The persist component is responsible for synchronizing the persistence of orders and trades that change due to the same event. In a particular embodiment, match engine 315 tags data with an event ID and orders tagged with the same event ID are matched, which enables the persist component 317 to know what records to synchronize and when.

Upon expiry of the time in force, the Persist process 317 will expire orders upon the close of a market, e.g., or at the beginning of a new trading day. The matching engine 315 receives a message to cancel the expired order(s) and processes the request. At the point that the order is canceled by the matching engine due to it expiring, the order is removed from the memory allocated to match engine 315 handling the order.

Orders may define a spread. A spread is the simultaneous purchase and sale of futures contracts for different months, different commodities, or different grades of the same commodity. A spread trade involves a "leg" component contract for each transaction. For example, one leg corresponds to the purchase and one leg corresponds to the sale. The present invention contemplates a leg pricing component 321 that prices "legs" (i.e., component contracts) involved in spread orders. Leg pricing component 321 may be implemented as a separate component or within match engine 315. When two spread orders match at a stated differential price between the two contracts involved in the spread, each component contract needs an "absolute" price so that it may be cleared independently of the other component contract to the spread trade. In the particular embodiment, leg pricing component 321 is stateless. Leg pricing component 321 includes processes to read settlement, last price and high/ low limits from the database when needed. Leg pricing processes 321 receive data related to high/low limits in order to determine if trade is price discovery or not. Any number of leg pricing components 321 may be created to meet the needs of a particular application.

Market data server component 109 operates to publish market data to any interested (i.e., subscribing) party, including clients 101, price reporting service terminals 203, trade management system 301, and others. Market data server component 109 preferably filter trades before broadcasting market data (price discovery, in and out of price limits, and the like). In the examples, an instance of a market data server component 109 corresponds to a specific market data service. For example, "level 1 market data" includes best bid and best offer price information whereas "level 2 market data" includes all bid and offer price information regardless of whether the bid or offer prices are the best or not. Any number of market data server components 109 may exist. These components will typically exists for so long as the level of data that they manage is being used by an external consumer.

One advantage of a distributed processing architecture as described above is that failure or malfunction of one instance of one component is unlikely to affect other instances of that same component or instances of different components. In this manner, a badly behaved instance is isolated. In a system in which many thousands of transactions may be pending at any instant, the ability to shut down one or only a few component instances and restart them is a powerful feature.

A LOCKDOWN message published on EMA 115 by any component will causes the exchange to halt. This means that no order entry or order maintenance is allowed. Validator instances stop accepting new orders and modifications to orders. Client market data displays, if synchronized with orders/trades, will be left alone. In the event that the client market data display is not synchronized, the display is preferably cleared to avoid unintended reliance on inaccurate data. End users and operators are informed of the halt.

A manual 'Resynch' process (button on admin or restart application) may be used to respond to and/or recover from a LOCKDOWN due to a critical component failure. A resynch will restart/reload market data system 109, restart/reload M.E. 315, restart/reload RAV (if RAV had the issue) 313, and restart/reload O.V. 311. At the appropriate time after appropriate notice to traders, the Exchange can be un-halted ("reopened") and everyone can resume trading activity.

Desirably, a robust and reliable monitoring system is in place for these components, one that can detect real failures in components, not raise false alarms, and can perform automated 'tests' to verify the loss of one of these components (hardware dead, network dead, and the like). When one of these components fails, action must be taken to recover the system such that all the components in the system are in a consistent state.

When persist component 317 detects database 319 is not functioning, the persist component 317 publishes a LOCKDOWN message on EMA bus 115, triggering the LOCKDOWN processing outlined above. Operations and support personnel address the issue as soon as possible to ensure functionality of database 319. Appropriate safeguards in the design of database 319 including RAID-type data protections and virtualized storage can make the likelihood of failure of database 319 extremely remote. Once the underlying issue is resolved a resynch is triggered, as outlined above.

Upon failure of a market data server 109 operations personnel are alerted. Operations personnel may manually monitor and/or use monitor processes to run tests to confirm the market data system 109 process is dead. When market data system 109 is verified dead, a LOCKDOWN message can be automatically published by the monitor if it ran the tests, or by the operations personnel manually if they run the tests. A Resynch is triggered, as outlined above.

When match engine 315 goes down a LOCKDOWN message should be published to EMA bus 315. Operations personnel and support personnel solve the issue ASAP, which ultimately leads to having the match engine 315 back up and running. A resynch is triggered, as outlined above.

If an issue is detected on either RAV 313 running as a single instance, or on one or more of the RAV engines 313 running on many instances, and that are important enough to cause a halt in trading, the following steps should be performed. All markets should be halted to allow downward modifications to order volume only by traders/FIX clients. Operations personnel and support personnel solve the issue as soon as possible. Some or all of the RAV instances may be recovered to return the system to a running condition. Minor inaccuracies in RAV instances 313 can be tolerated in some applications. At the appropriate time, after notice to traders, all markets may be reopened.

Upon failure of a validator 311, the exchange is halted to prevent all trading activity. Of course, if validator instances 311 cannot be created, no new orders can enter the system. Operations personnel and support personnel must solve the issue. At the appropriate time after appropriate notice to traders, the exchange can be un-halted and trading activity can resume.

In competitive markets such as a futures exchange, it is important to implement procedure and rules to prevent publication of market data that reflects trades that in fact did not occur due to a customer cancellation or change, failure of a component, or other anomaly. The architecture of the present invention makes market data available so quickly that this can become a significant issue. Accordingly, EMA bus 115 components preferably follow a "persist before publish" rule in specific circumstances. Each subscriber component will need the ability to send an error back to publisher component, with possible rollback processing as a result.

Whether the publishing of market data is to be synchronized with the successful persistence and publishing of order/trade data that caused the market data is optional. Market data synchronization effectively means the system does not publish any level 1 or level 2 market data that is caused by an order or trade that failed to be persisted and thus will not exist when the system components resynchronize off the databases subsequent to a LOCKDOWN, as described above. However, the market data synchronization of the successful persistence of orders and trades with the distribution of level 1 and 2 data is at the possible expense of throughput and performance.

To enable the system to keep a full audit trail of order status changes, for both the end user and compliance purposes, the match engine 315 reports at least a minimum amount of information required for the persist component 317 to create the audit trail. Additionally, match engine 315 should support "pass through data", i.e., information that is associated with an order (user, account, etc.) that is of no interest to the match engine 315, but is of definite interest to the persisting process at the end of the stream.

Optionally, validator component 311 could keep a record of incoming order changes requested by a client, and strike these from its list once it gets confirmation from EMA bus 115 that this order change persisted. This gives us the ability, should a LOCK DOWN message go out and the validator 311 is up and running, to report back to a client the specifics of any orders that did not make it into the system rather than a general message.

Figure 4:
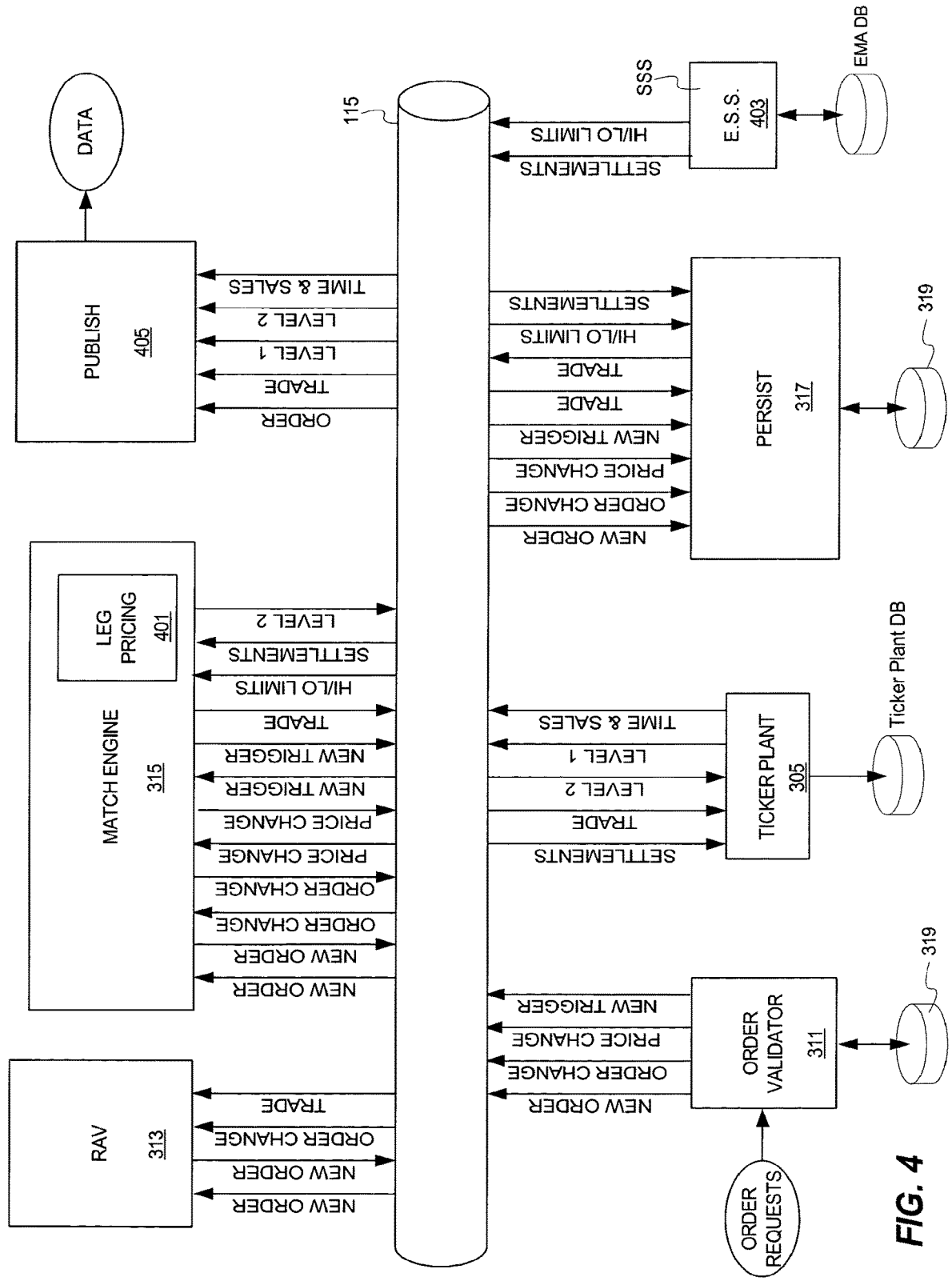
FIG. 4 illustrates entities and selected messaging relationships between various entities in accordance with an embodiment of the present invention.
Figure 5:
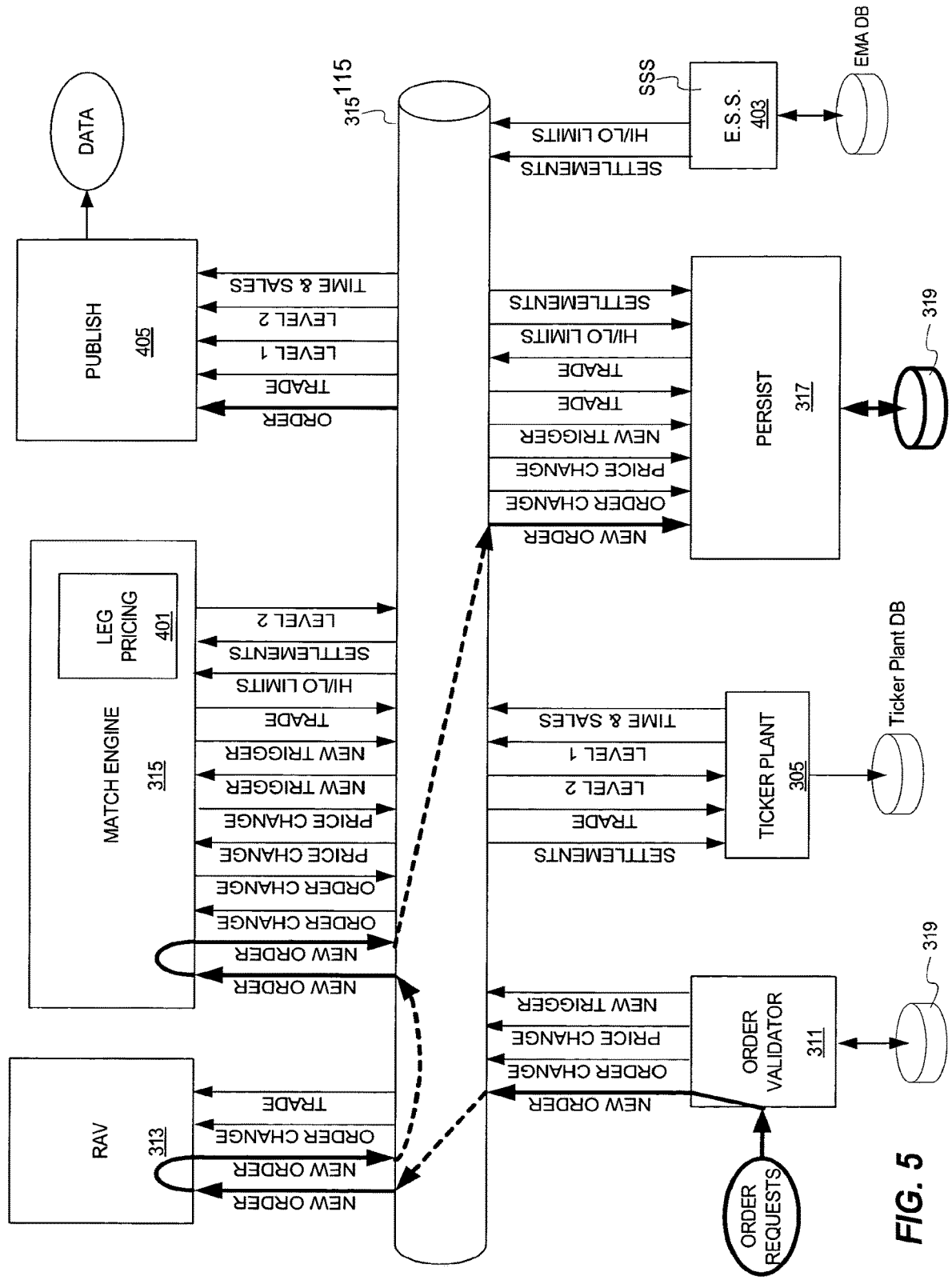
FIG. 5 illustrates the system of FIG. 4 with new order messaging exchanges highlighted.
Figure 6:
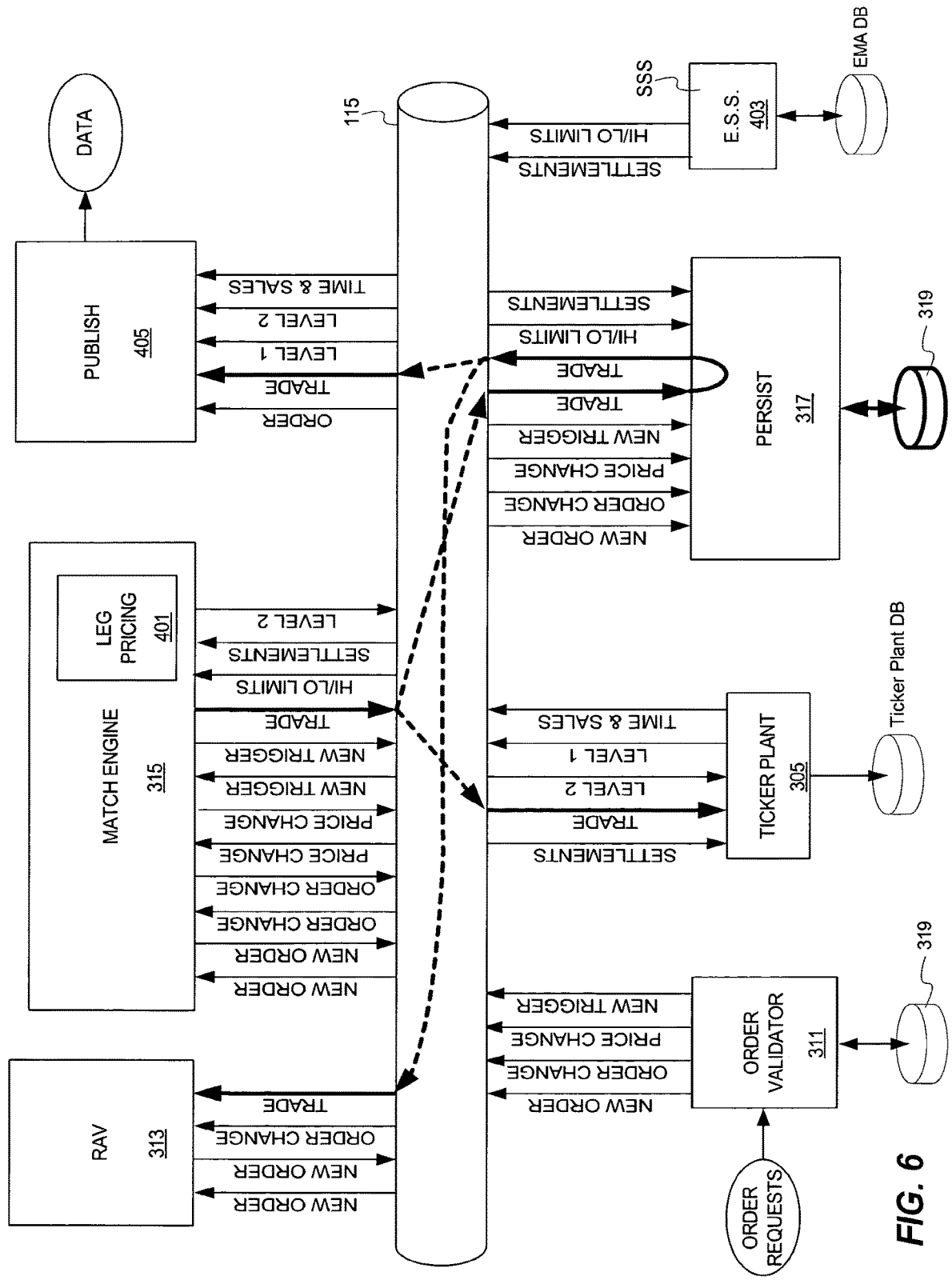
FIG. 6 illustrates the system of FIG. 4 with trade-related messaging exchanges highlighted.

FIG. 4 illustrates a logical view of a system in accordance with the present invention with emphasis on the interconnectivity provided by EMA bus 115. FIG. 5 and FIG. 6 are similar to FIG. 4 but differ in that communications between components through EMA bus 15 are illustrated by bold lines. In FIG. 4 through FIG. 6, each of the arrowed lines indicates an EMA bus message. Each message may have any number of subscribers. In FIG. 4 through FIG. 6, an arrow pointing away from a component indicates that the component is a publisher of that message. Conversely, an arrow pointing towards a component indicates that the component is a subscriber to that message.

Any number and variety of messages may be defined for a particular trading environment, and only a subset of messages are illustrated herein. Moreover, each message is preferably self-describing such as may be implemented using XML documents as the message carrier. This enables new message types to be defined quickly and easily without impacting existing message types nor requiring changes to components. Typically, each subscriber takes some action in response to hearing a message to which it subscribes.

Table 1 below includes an exemplary subset of EMA bus messages used in an implementation of the present invention. In table 1, the column labeled "subject" includes a name given to a particular message type, the column labeled "publisher" identifies the component that generates the bus message, "subscriber" indicates the components that receive or subscribe to that message type, and the "comments" column provides a brief description of the purpose of the message types. Messages including a <clusterid> designation indicate messages that, when contract clustering is used, will be specifically addressed to subscriber components associated with a particular cluster ID. In these cases, a unique instance of the subscribing component exists for each unique contract cluster ID. When contract clustering is not used, the "clusterid" value is not required in the message.

TABLE 1

| Subject | Pub | Sub | Comment |
| --- | --- | --- | --- |
| /cpt/orderrequest/<clustid> | V | RAV | A new order from the Validator to RAV |
| /cpt/orderaccept/<clustid> | RAV | ME | RAV accepts, sends to ME |
| /cpt/orderreject | RAV | V | RAV rejects, sends to V |
| /cpt/orderactive/<clustid> | ME | Persist | M.E. accepted new order, sends to Persist |
| /cpt/error/order | ME | V | M.E. rejects order due to error (dupe order ID, etc.) |
| | | RAV | |
| | | Ops | RAV listens to undo order, V listens |
| | | MDS. | to send error to client |
| /cpt/marketdata/level2/<clustid> | ME | T.P. | |
| /cpt/mds/level2/<clustid> | T.P. | MDS | |
| /cpt/ordernewpersist/<clustid> | Persist | MDS | Persist has stored the order, sends to MDS |
| /cpt/marketdata/level1/<clustid> | T.P. | MDS | T.P. creates Level 1 data, sends to MDS |
| /cpt/mds/orderupdate | Persist | MDS | |
| /cpt/tradepersist | Persist | RAV | |
| | | MDS | |
| | | Trans | |
| /cpt/reallocationsrequest | V | RAV | |
| /cpt/reallocationsaccept | RAV | Persist | |
| /cpt/reallocationsreject | RAV | V | |
| /cpt/reallocationspersist | Persist | Trans | |
| | | MDS | |
| /cpt/trades | ME | Persist | |
| /cpt/setcontractstates | S.G. | Persist | Sending state group updates to be persisted |
| /cpt/me/setcontractstates | Persist | ME | After persisting state change, sent to ME |
| /cpt/tp/setcontractstates | ME | T.P. | State group updates after ME has done with them |
| | | RAV | |
| /cpt/mds/setcontractstates | T.P. | MDS | |
| /cpt/setsystemstates/eod | S.G. | RAV | |
| /cpt/setsystemstates/sod | S.G. | T.P. | |
| /cpt/orderinactivenew | V | Persist | New (inactive) order, straight to persist |
| /cpt/ordermodify | V | RAV | Modified order |
| /cpt/ordermodifyrequest | RAV | ME | |
| /cpt/ordermodified | ME | Persist | |
| /cpt/orderinactivemodify | V | Persist | Modified (inactive) order, straight to persist |
| /cpt/orderspull | V | ME | Cancel/deactivate |
| /cpt/orderspulled | ME | Persist | |
| | | RAV | |
| /cpt/ordersinactivepull | V | Persist | Cancel an inactive order, straight to persist |
| /cpt/ordermodifyreject/rav | RAV | V | |
| /cpt/ordermodifyreject/me | ME | V | |
| | | RAV | |
| /cpt/orderspullreject | ME | V | |

TABLE 1-continued

| Subject | Pub | Sub | Comment |
|---|---|---|---|
| /cpt/mds/positionupdate | Persist | MDS | |
| /cpt/voidtrade | V | Persist | |
| /cpt/voidpersist | Persist | RAV | |
| | | MDS | |
| | | Trans | |
| /cpt/tp/voidpricereport | Persist | T.P. | |
| /settlements | TMS | ME | |
| | ESS | Persist | |
| | | TP | |
| /cpt/lockdown | Monitor | V | |
| /cpt/unlock | Monitor | V | |

Key:
V = Validator Component
RAV = RAV Component
M.E. = Match Engine Component
T.P. = Ticker Plant Component
Persist = Persist Component
S.G. = State Generator
MDS = Market Data Services Component
T.M.S. = Trade Management System Referring to FIG. 4, validator 311 publishes a message (e.g., an "AddOrder" message described above) upon validating a received order request. Validator 311 also publishes messages related to order changes such as order volume changes and order price changes in response to receiving validated order change requests. Validator 311 also publishes a message in response to a new trigger. Although not shown in FIG. 4, validator 311 also subscribes to various messages relating to order rejections by components such as RAV 313 and match engine 315.

RAV component 313 subscribes to messages relating to new orders, order changes, and executed trades. RAV component 313 publishes messages related to new orders that satisfy the risk allocation valuation rules implemented by RAV component 313. With respect to order changes and executed trades, RAV component 313 uses the information to adjust the information it maintains about each account, such as position sizes and margin information, and the like. In the case of an executed trade, for example, RAV 313 does not have a defined role in accepting or rejecting a trade that has already been executed. In the particular embodiment, RAV 313 receives trade information from messages generated by persist component 317 and so will not be aware of trades handled by the trading system until they are persisted. In some embodiments, RAV 313 may also be coupled to clearing processes 303 to determine whether trades executed outside the trading system will be accepted/rejected for clearing.

Match engine 315 subscribes to messages related to new orders, order changes, price changes, new triggers, high/low limits and settlements in the example. Match engine publishes information related to executed trades as well as market data related to the trading that goes on within the contract cluster corresponding to the particular match engine instance. Leg pricing component 411 is instantiated within match engine 315 as needed.

Ticker plant 305 and publish component 405 subscribe to messages containing information that they use to prepare market data. In general, ticker plant 305 may subscribe to messages immediately, before they are persisted whereas publish component 405 subscribes to messages related to persisted events. In this manner, publisher 405, which may provide market data to third party vendors, does not publish any market data related to or derived from orders, trades, or other events that have not yet been made persistent.

FIG. 5 illustrates the system of FIG. 4 and highlights a series of inter-component message exchanges that occur when an order request is received by validator 311. The bold lines represent an exemplary flow of messages. For example, validator 311 publishes a new order message to which RAV component 313 subscribes. RAV component 313 publishes a new order message to which match engine 315 subscribes. Although it is possible for both match engine 315 and RAV component 313 to subscribe to the same message from validator 311, by imposing a sequential order on the messages match engine 315 will not become aware of a new order until it is accepted as satisfying the business rules implemented by RAV 313. Match engine 315, in turn, publishes a new order message to persist component 317 such that database 319 holds a persistent copy of each new order.

Referring to FIG. 6, when match engine 315 makes a trade, a trade message is published to subscribers including ticker plant 305 and persist component 317. Persist component 317 stores information about the executed trade in database 319, and updates corresponding order information that was previously stored for the orders related to the executed trade. Persist component 317 publishes a message that is subscribed to by both publish component 405 and RAV component 313. Publish component 405 uses the trade message to compile market data for distribution. RAV component 313 uses the trade message to update account records for use in assessing subsequent orders made on the same account.

It can be appreciated that the rich and flexible messaging implemented by EMA bus 115 enables the various processes involved in a trading system to be implemented as a plurality of discrete, special-purpose components. Failure of any one component will not cause a failure of other components in the system. This allows the other components to continue operation, or to shut down and restart gracefully so that trade information is not corrupted.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A distributed computer trading system comprising:
an order submission point computing device communicatively coupled to a network, wherein the order submission point receives an electronic order entry via a network interface;
a trading platform computing system comprising one or more processors for providing trading services, the trading platform comprising a plurality of trading platform components including a match engine and an order validator;
an enterprise messaging architecture (EMA) bus communicatively coupled to the plurality of trading platform components of the trading platform computing system and to one or more components of an electronic execution services computing system, wherein messages published by a first component is subscribed by at least a second component and a third component, wherein the third component comprises a persist component; and
the electronic execution services computing system comprising one or more processors implementing a plurality of trading system components including a risk allocation value (RAV) component, the electronic execution services computing system configured at least to process instructions stored in a memory device that, when executed by the one or more processors, cause the electronic execution services computing system to:
monitor the RAV for an indication of normal operation or an indication of an error;
receive, from the order validator of the trading platform computing system via a network, an electronic order request, the electronic order request associated with an account and comprising a self-describing message including state information corresponding to the electronic order request, wherein the persist component and the match engine are maintained on a contract cluster basis and wherein the electronic order request corresponds to a contract for delivery of a specific product at a specific delivery point and delivery date and is associated with a contract cluster;
process, by the RAV component, the electronic order request associated with the account, the electronic order request being associated with an order for a financial instrument and having an order size;
determine, by the RAV component, an overall RAV size limit of the account, wherein the overall RAV size limit is threshold corresponding to a total size of all positions held in the account;
determine, via one or more messages sent via the EMA bus, a combined size based on a size of existing positions of the account and the order size;
permit, by the RAV component, matching using the electronic order request if the combined size does not exceed the RAV size limit;
for an indication of normal operation of the RAV based on the monitoring:
communicate, from the RAV component to the match engine via the EMA bus, the electronic order request when matching is permitted based on an associated contract cluster ID associated with the order request; and
reject the electronic order request if the combined size exceeds the RAV size limit; and
for an indication of an error of the RAV based on the monitoring:
issue a lockdown message via the EMA bus causing the order validator to stop accepting new orders and order modifications; and
shutdown operation of all components of the electronic execution services computing system including the RAV component and wait for an unlock command.

2. The system of claim 1, wherein the account is associated with a position limit.

3. The system of claim 2, wherein the position limit is a net long position limit or a net short position limit for a type of contract.

4. The system of claim 3, wherein the type of contract is a commodity contract.

5. The system of claim 2, wherein the electronic execution services computing system is further configured to process software instructions that cause the computer to determine a size of existing positions of a same type as the financial instrument.

6. The system of claim 5, wherein to permit the matching is further in response to determining that an aggregate of the size of existing positions of the same type and the order size does not exceed the position limit.

7. The system of claim 1, wherein the electronic order request identifies a contract cluster.

8. The system of claim 7, wherein the contract cluster specifies a relationship between the financial instrument and a second financial instrument.

9. The system of claim 8, further comprising a match engine configured to simultaneously consider the financial instrument and the second financial instrument during matching.

10. The system of claim 8, wherein the relationship is a spread relationship or a strip relationship.

11. A method comprising:
receiving, via a network at an order submission point computing device, an electronic order request associated with an account;
processing, by a computer device implementing a plurality of trading system components including a risk allocation value (RAV) component of a trading platform, the order request associated with the account, the electronic order request being associated with an order for a financial instrument and having an order size;
monitoring, by the computing device, operation of the RAV component;
while the RAV component is operating normally:
determining, by the computer device, an overall RAV size limit of the account, wherein the size limit is a total size of all positions held in the account;
determining, by the computer device, a combined size based on a size of existing positions of the account and the order size based on one or more messages published to an enterprise messaging architecture (EMA) bus, wherein messages published by a first component is subscribed by at least a second component and a third component, wherein the third component comprises a persist component and wherein the persist component and a match engine are maintained on a contract cluster basis and wherein the order request corresponds to a contract for delivery of a specific product at a specific delivery point and delivery date and is associated with a contract cluster;
permitting, by the computer device, matching using the electronic order request when the combined size does not exceed the RAV size limit;

communicating, via the EMA bus using a communication link, the electronic order request if the order request is permitted to be matched based on an associated contract cluster ID associated with the order request;

rejecting, by the computer device, the electronic order request if the combined size exceeds the RAV size limit;

upon identification by the computing device of an error in the RAV component operation:

issuing, by the computing device, a lockdown message via the EMA bus; and shutdown, by the computing device, operation of each the plurality of trading system components including the RAV component, until an unlock command is received.

12. The method of claim 11, wherein the account is associated with a position limit.

13. The method of claim 12, wherein the position limit is a net long position limit or a net short position limit for a type of contract.

14. The method of claim 13, wherein the type of contract is a commodity contract.

15. The method of claim 12, further comprising determining a size of existing positions of a same type as the financial instrument.

16. The method of claim 15, wherein the permitting of the matching is further in response to determining that an aggregate of the size of existing positions of the same type and the order size does not exceed the position limit.

17. The method of claim 11, wherein the electronic order request identifies a contract cluster.

18. The method of claim 17, wherein the contract cluster specifies a relationship between the financial instrument and a second financial instrument.

19. The method of claim 18, further comprising simultaneously considering the financial instrument and the second financial instrument during matching.

20. The method of claim 18, wherein the relationship is a spread relationship or a strip relationship.

\* \* \* \* \*